United States Patent
Cheah et al.

(10) Patent No.: US 7,728,817 B2
(45) Date of Patent: Jun. 1, 2010

(54) OPTICAL NAVIGATION SYSTEM WITH MULTIPLEXED IMAGE PROCESSING

(75) Inventors: Chiang Sun Cheah, Penang (MY); Chin Heong Yeoh, Penang (MY); Li Chong Tai, Penang (MY)

(73) Assignee: Avago Technologies ECBU IP (Singapore) Pte, Ltd., Singapore (SG)

( * ) Notice: Subject to any disclaimer, the term of this patent is extended or adjusted under 35 U.S.C. 154(b) by 1087 days.

(21) Appl. No.: 11/401,539

(22) Filed: Apr. 10, 2006

(65) Prior Publication Data

US 2007/0236455 A1    Oct. 11, 2007

(51) Int. Cl.
G09G 5/08   (2006.01)

(52) U.S. Cl. .................................. 345/166; 345/170

(58) Field of Classification Search .............. 345/166, 345/170
See application file for complete search history.

(56) References Cited

U.S. PATENT DOCUMENTS

| | | | |
|---|---|---|---|
| 5,483,081 A * | 1/1996 | Hosoi | 250/585 |
| 5,761,229 A * | 6/1998 | Baldwin et al. | 372/31 |
| 6,750,974 B2 * | 6/2004 | Svetkoff et al. | 356/602 |
| 2003/0075674 A1 * | 4/2003 | Anderson et al. | 250/221 |

* cited by examiner

Primary Examiner—Richard Hjerpe
Assistant Examiner—Sahlu Okebato

(57) ABSTRACT

An optical navigation system having two or more optical pipelines for image acquisition and a single multiplexed optical array. Each of the two or more optical pipelines for image acquisition may include an illuminator that emits optical radiation at a navigation surface where each navigation surface is separate from the other navigation surfaces. The single multiplexed optical array may be configured to receive optical radiation reflected from the respective navigation surfaces. The optical navigation system may further include illuminator drivers that control each of the optical pipelines for image acquisition and an optical sensor that is configured to multiplex the images recovered by the optical pipelines for image acquisition and perform image correlation for the different navigation surfaces.

20 Claims, 6 Drawing Sheets

OPTICAL NAVIGATION SYSTEM WITH MULTIPLEXED IMAGE PROCESSING

BACKGROUND OF THE INVENTION

Non-mechanical tracking devices, such as computer mice, are rapidly growing in popularity worldwide. Many of these non-mechanical tracking devices utilize optical navigation technology that measures the changes in position of the non-mechanical tracking devices by optically acquiring sequential surface images and mathematically determining the direction and magnitude of the movement.

As an example, in a non-mechanical tracking device such as an optical mouse, optical navigation technology involves capturing an image and then analyzing and tracking the motion of microscopic texture or other features on a surface under the optical mouse. In general, these types of optical mice depend on tracking surface detail and most work surfaces are microscopically textured with such tracking surface detail. When these surface textures are illuminated by a light source such as a light emitting diode ("LED"), a pattern of highlights and shadows is revealed. Optical mice then "watch" these surface details move by imaging them onto navigation integrated circuits ("navigation ICs").

As an example, in FIG. 1, a block diagram 100 of an example of a known implementation of an optical navigation device 102 above a navigation surface 104 is shown. The optical navigation device 102 may be a non-mechanical tracking device such as an optical mouse. Generally, optical navigation technology involves capturing an image on the navigation surface 104 and then analyzing and tracking the motion of microscopic texture or other features on the navigation surface 104 under the optical navigation device 102. Thus, the optical navigation device 102 depends on tracking the navigation surface 104 detail because most navigation surfaces 104 are microscopically textured. When these surface textures are illuminated 106 by a light source such as an LED in an emitter module 108, a pattern of highlights and shadows is revealed at a point of illumination 110 on the navigation surface 104. The optical navigation device 102 then "watches" the surface details of the navigation surface 104 move by imaging 112 the navigation surface 104 details at the point of illumination 110 onto a detector module 114 in the optical navigation device 102. The detector module 114 may be part of a navigation integrated circuit ("IC") 116 located within the optical navigation device 102. The navigation IC 116 may also include a navigation engine 118 where the navigation engine 118 is a device capable of receiving imaging information from the detector module 114 and, in response, determining the position of the optical navigation device 102.

The optical navigation device 102 may also be implemented as a laser optical navigation device. As an example of a laser optical navigation device, a vertical cavity surface-emitting laser ("VCSEL") may be utilized as the light source in the emitter module 108 to illuminate the point of illumination 110 on navigation surface 104. A VCSEL is a semiconductor micro-laser diode that emits light in a cylindrical beam vertically from the surface of a fabricated wafer, and offers advantages in both performance and cost when compared to other semiconductor lasers such as edge-emitting lasers. The VCSELs are cheaper to manufacture in quantity because VCSELs may be fabricated efficiently using standard microelectronic fabrication methods, allowing integration of VCSELs on-board with other components without requiring pre-packaging. Additionally, VCSELs are easier to test, and are more efficient. Moreover, VCSELs require less electrical current to produce a given coherent energy output and emit a narrow, more nearly circular beam than traditional edge emitters.

In FIG. 2, a cross-sectional side view of an example of an implementation of a known laser optical navigation device 200 that utilizes a VCSEL is shown above a navigation surface 202. The laser optical navigation device 200 may include a base plate 204 to which is attached a lens 206. In this implementation, the emitter module 108 of FIG. 1 is VCSEL 208 that is attached to and aligned with the lens 206 by VCSEL assembly clip 210. The VCSEL 208 has attached to it a VCSEL printed circuit board ("PCB") 212, which may be customer-supplied and is programmable dependent on the application. The equivalent of the detector module 114 of FIG. 1 is optical sensor 214 that is in signal communication with sensor PCB 218.

In an example of operation, the VCSEL 208 may emit emitted optical radiation 220 at the navigation surface 202 at a predetermined angle. The emitted optical radiation 220 is then reflected by the navigation surface 202, resulting in reflected optical radiation 222 that passes through the sensor aperture 216 of the lens 206. After the emitted optical radiation 220 is focused by the sensor aperture 216, it is received by the optical sensor 214. The optical sensor 214 may include an image acquisition system, a Digital Signal Processor ("DSP"), a two channel quadrature output, and a four-wire serial port. An example of such an optical sensor 214 is the Avago Technologies' ADNS-6000 optical sensor. Output signals from the optical sensor 214 may be read by a microcontroller (not shown) to obtain any horizontal and vertical motion information resulting from movement of the laser optical navigation system 200 relative to the navigation surface 202.

The emitter module, in this case, the VCSEL 208, the lens 206, the optical sensor 214, the sensor aperture 216, and the sensor PCB 218 may be considered as an optical pipeline for image acquisition. Unfortunately, the optical navigation system 200 has only a single image-acquisition optical pipeline that is capable of acquiring images for correlation purposes. There are, however, applications that require sensing the movement of a device relative to two or more different surfaces. One approach to meeting this requirement is to use two or more optical navigation sensors. This approach, however, is inefficient and costly.

Thus, there is a need for an optical navigation system and method that is capable of measuring the movement of two or more surfaces using a single integrated device capable of processing images reflected from the two or more surfaces.

SUMMARY

An optical navigation system having two or more optical pipelines for image acquisition and a single multiplexed optical array is described. Each of the two or more optical pipelines for image acquisition may include an emitter module that may include a light source configured to emit emitted optical radiation at a navigation surface where each navigation surface is separate from the other navigation surfaces. The single multiplexed optical array may include a plurality of photo-detectors configured to receive received optical radiation reflected from the respective navigation surfaces, wherein the received optical radiation is a portion of the emitted optical radiation reflected by the navigation surface. The optical navigation system may further include an illuminator driver that controls each optical pipeline for image acquisition and is configured to multiplex the images recovered by the optical pipelines for image acquisition and perform image correlation for different navigation surfaces.

In an example of operation, the optical navigation system with multiplexed imaging emits emitted optical radiation from a first emitter module to a first navigation surface and receives reflected optical radiation from the first navigation surface at an optical array. The first emitter is then powered off, and a second emitter module emits emitted optical radiation to a second navigation surface and reflected optical radiation from the second navigation surface is received at the same optical array. The optical navigation system with multiplexed imaging may include an illuminator driver that drives each emitter separately and that is configured to vary the processing intervals between the multiple emitters based on the relative motion of each navigation surface, e.g., the emitter imaging a faster moving surface may have a longer power-on interval than an emitter imaging a slower moving surface.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, reference is made to the accompanying drawings that form a part hereof, and which show, by way of illustration, a specific embodiment in which the invention may be practiced. Other examples of implementation may be utilized and structural changes may be made without departing from the scope of the present invention.

Figure 1:
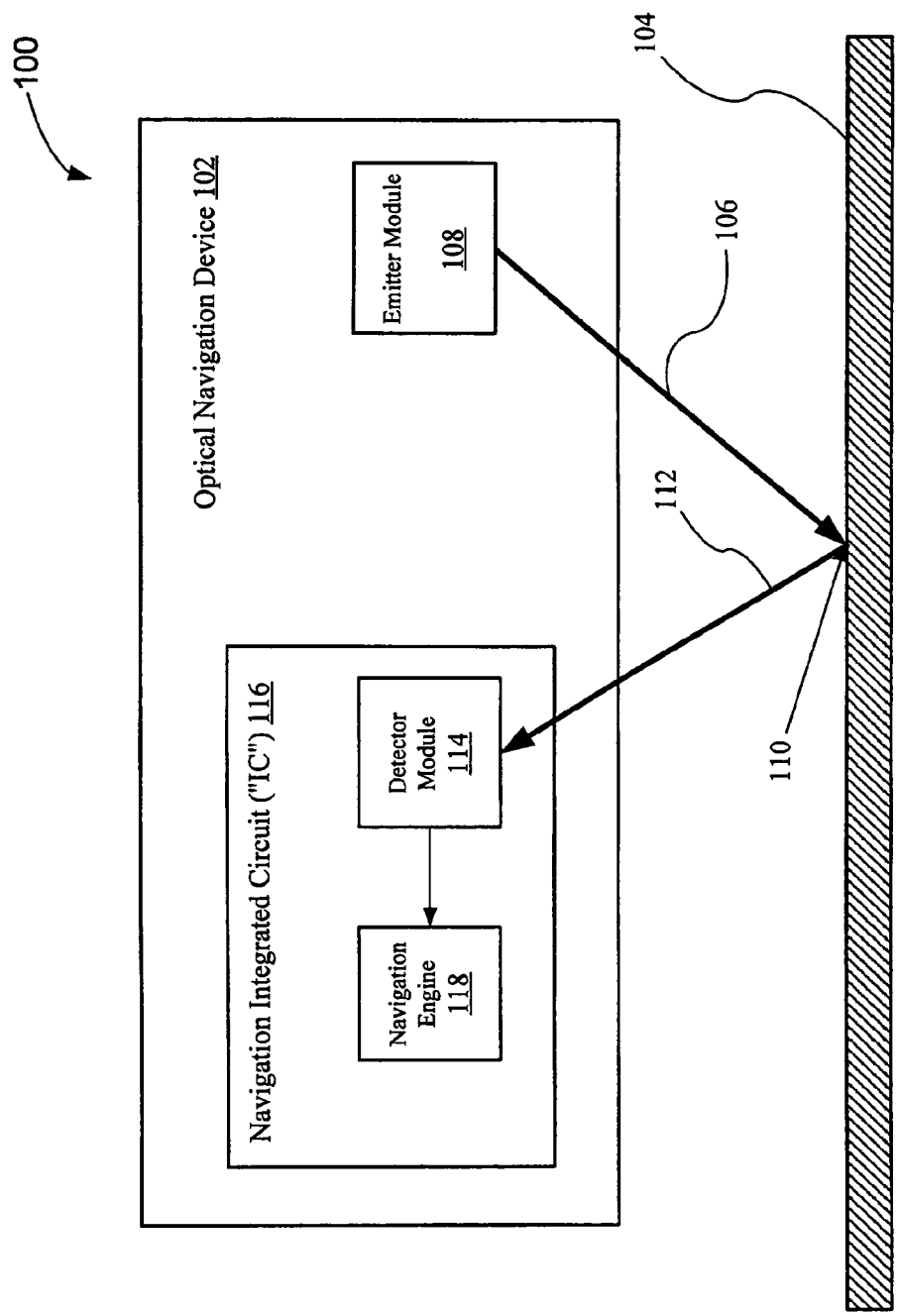
FIG. 1 shows a block diagram of an example of an implementation of a known optical navigation system.
Figure 2:
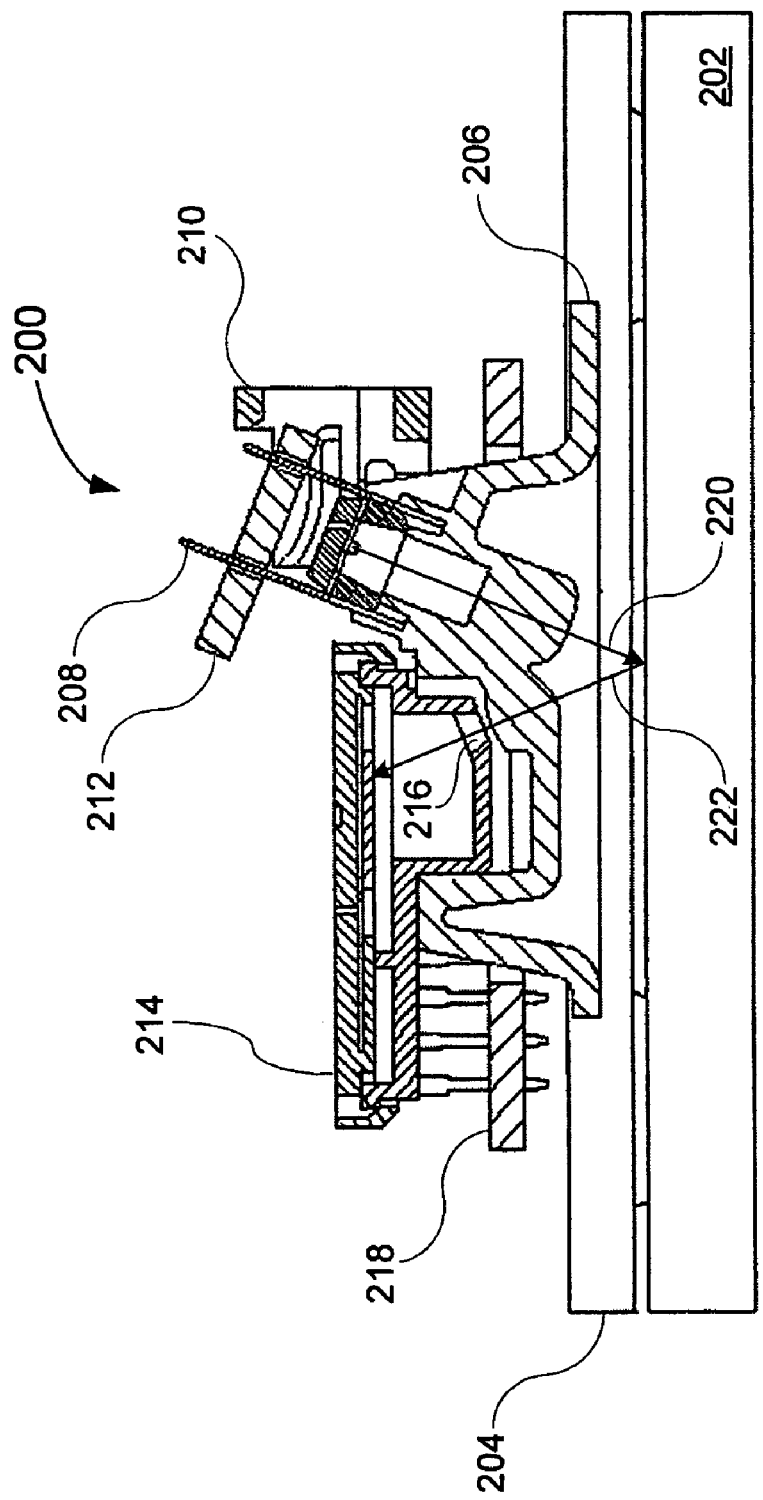
FIG. 2 shows a cross-sectional side view of an example of an implementation of an optical navigation system that uses a Vertical Cavity Surface-Emitting Laser ("VCSEL") as the light source.
Figure 3:
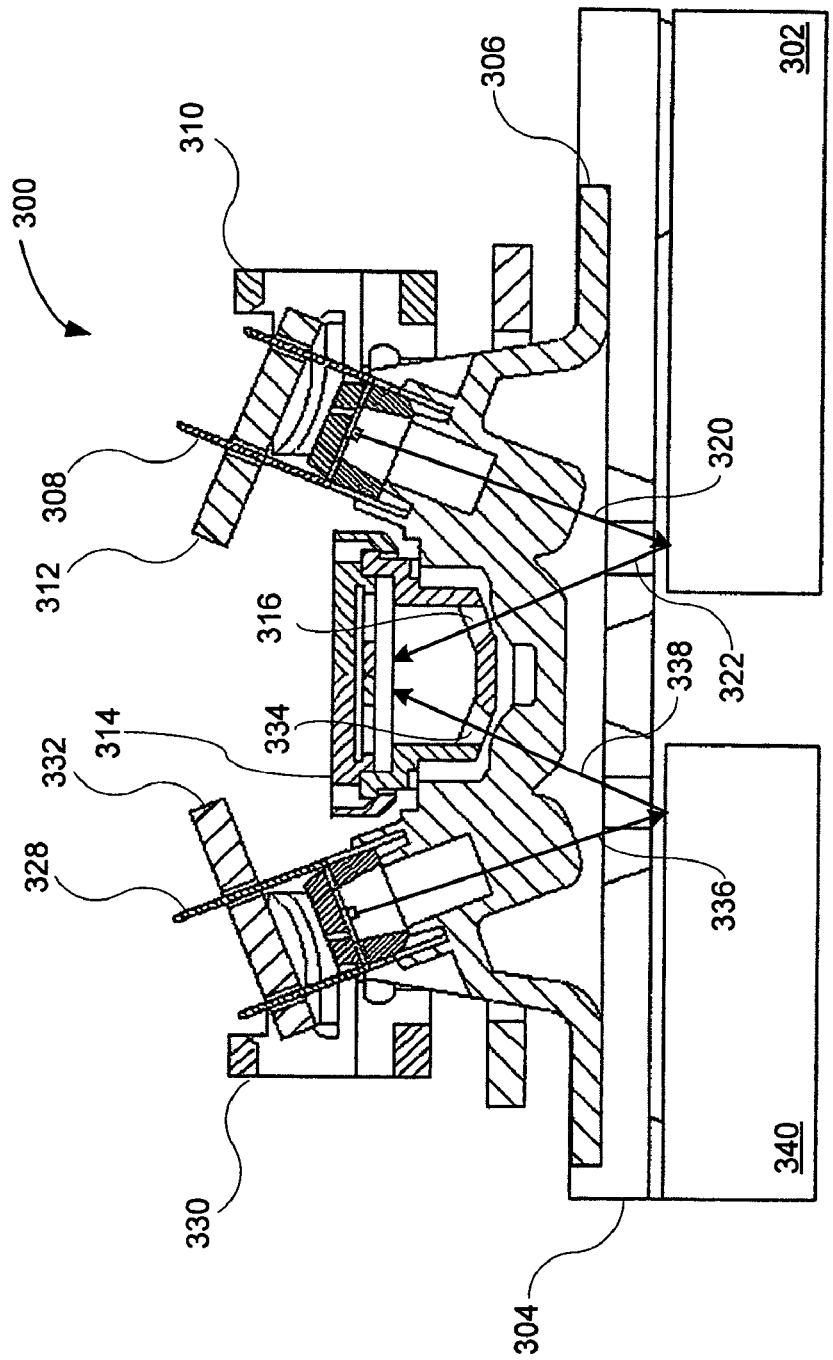
FIG. 3 shows a cross-sectional side view of an example of an implementation of an optical navigation system having two sources of light that are emitted at two separate navigational surfaces.

In FIG. 3, a cross-sectional side view of an example of an implementation of an optical navigation system with multiplexed imaging ("ONS-MI") having two sources of light that are emitted at two separate navigational surfaces is shown. In general, ONS-MI 300 includes two VCSELS 308 and 328, and as in FIG. 2, may also include a base plate 304 to which is attached a lens 306. First VCSEL 308 and second VCSEL 328 are attached to and aligned with lens 306 by VCSEL assembly clips 310 and 330, respectively. VCSEL PCB 312 and VCSEL PCB 332 are attached to First VCSEL 308 and Second VCSEL 328, respectively. Optical sensor 314 is also attached to the lens 306 and may also be in signal communication with a sensor PCB (not shown).

In an example of operation, first VCSEL 308 may emit emitted optical radiation 320 at a first navigation surface 302 at a predetermined angle. The emitted optical radiation 320 is then reflected by the first navigation surface 302, resulting in reflected optical radiation 322 that passes through first sensor aperture 316 of the lens 306. After the reflected optical radiation 322 is focused by first sensor aperture 316, it is received by the optical sensor 314, which may be similar to the optical sensor 214 of FIG. 2.

When the first VCSEL 308 is powered off, second VCSEL 328 may then emit emitted optical radiation 336 at a second navigation surface 340 at a predetermined angle. The emitted optical radiation 336 is then reflected by the second navigation surface 340, resulting in reflected optical radiation 338 that passes through second sensor aperture 334 of the lens 306. After the reflected optical radiation 338 is focused by second sensor aperture 334, it is received by the optical sensor 314. It is appreciated by those skilled in the art that first sensor aperture 316 and second sensor aperture 334 may be positioned in the lens 306 at any angle relative to the base plate 304 and that the ONS-MI 300 may also have additional aperture openings in other implementations.

The optical sensor 314 may also include multiple illuminator drivers that drive each emitter or illuminator separately. For example, when images are required from navigation surface 302, the optical sensor 314 will then power on first VCSEL 308, and power off second VCSEL 328. The images that fall on the optical sensor 314 will be from navigation surface 302 and an image correlation routine may be used to process images from navigation surface 302 to determine the relative motion direction of navigation surface 302. When images are required from navigation surface 340, second VCSEL 328 will be powered on, while first VCSEL 308 will be powered off. The optical sensor 314 may multiplex itself to perform image correlation on navigation surface 340 to determine the relative motion direction of navigation surface 340. In order to minimize the number of re-referenced surfaces during switching between navigation surfaces, reference image RAM (not shown) may be used to keep the last image of each navigation surface. This will reduce the re-referencing frequency and provide smoother tracking.

Figure 4:
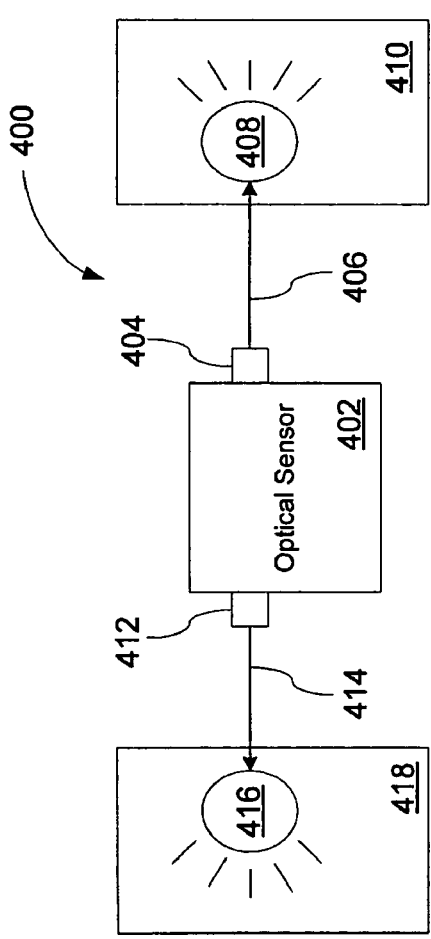
FIG. 4 shows a block diagram of an example of an implementation of a multiplexed optical navigation sensor.

In FIG. 4, a simplified block diagram of an example of an implementation of a multiplexed imaging optical navigation sensor is shown. In FIG. 4, optical sensor 402 may include Driver A 404 and Driver B 412 that are in signal communication with Illuminator A 408 and Illuminator B 416, respectively, where Illuminator A 408 and Illuminator B 416 may be VCSELs, LEDs, or any other light source. When images are required from navigation surface 410, optical sensor 402 will power on Illuminator 408 by means of a control signal 406, while Illuminator 416 will be powered off. Optical sensor 402 will multiplex itself to perform image correlation on navigation surface 410 to determine the relative motion direction of navigation surface 410. When images are required from navigation surface 418, optical sensor 402 will power on Illuminator 416 by means of a control signal 414, while Illuminator 408 will be powered off. The process repeats itself and optical sensor 402 performs image correlation on navigation surface 418 to determine the relative motion direction of navigation surface 418. When the process is completed for navigation surface 418, the cycle repeats itself as needed for all navigation surfaces that are measured by optical sensor 402.

A process may be used to multiplex and to control the power ON/OFF of the illuminator drivers in an optical sensor. A register setting may be included in the optical sensor's configuration to allow setting of the image processing interval for each navigation surface. Additionally, dynamic intervals for a navigation surfaces may be determined that are dependent on the rate of motion of each navigation surface. For example, because a navigation sensor may operate up to 6000 frames per second ("fps"), a portion of the frames in a second may be used for image integration for surface A, while the remaining portion of frames in a second may be used in image integration for surface B. In the case of dynamic interval determination, as the optical sensor detects that a navigation surface's motion increases relative to that of the other navigation surface being measured, more frames may be allocated to the faster moving surface at the expense of the slower moving navigation surface. With the high frame rates of available optical sensors, the effective frame rate after multiplexing (say, for example, 3000 fps) will still provide smooth tracking.

Figure 5:
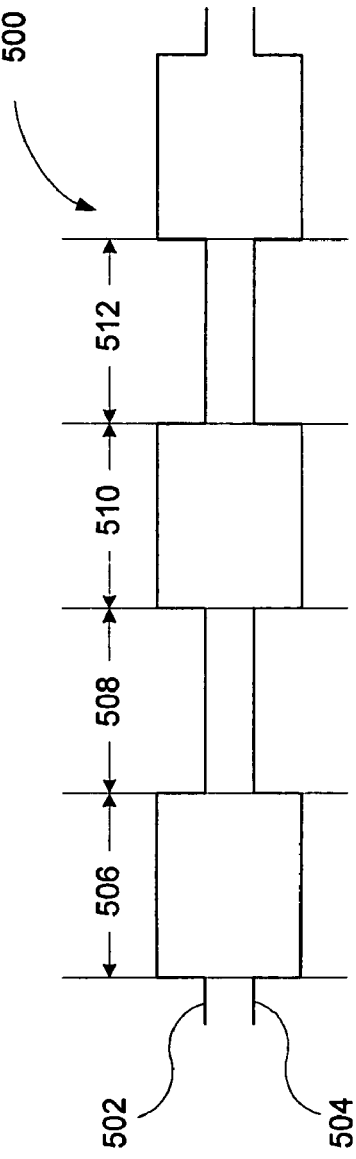
FIG. 5 shows a waveform diagram that illustrates multiplexing image integration and processing for two optical pipelines for image acquisition.

In FIG. 5, a waveform diagram 500 that illustrates multiplexing image integration and processing for two optical pipelines for image acquisition is shown. Waveform 502 represents the timing of Illuminator A with the high state representing the ON condition where Illuminator A is ON and Illuminator B is OFF. Waveform 504 represents the timing of Illuminator B with the high state representing the ON condition where Illuminator B is ON and Illuminator A is OFF. Intervals 506 and 510 represent the time interval, which may be in number of frames, during which Illuminator A is ON, while Intervals 508 and 512 represent the time interval during which Illuminator B is ON. As noted above, in the case of dynamic interval determination, as the optical sensor detects that an increase in the rate of motion of Illuminator A, the length of Intervals 506 and 510 may increase relative to that of Intervals 508 and 512, with more frames being allocated to the image capture and processing of navigation surface A 410, FIG. 4, before returning to navigation surface B 418, FIG. 4.

Figure 6:
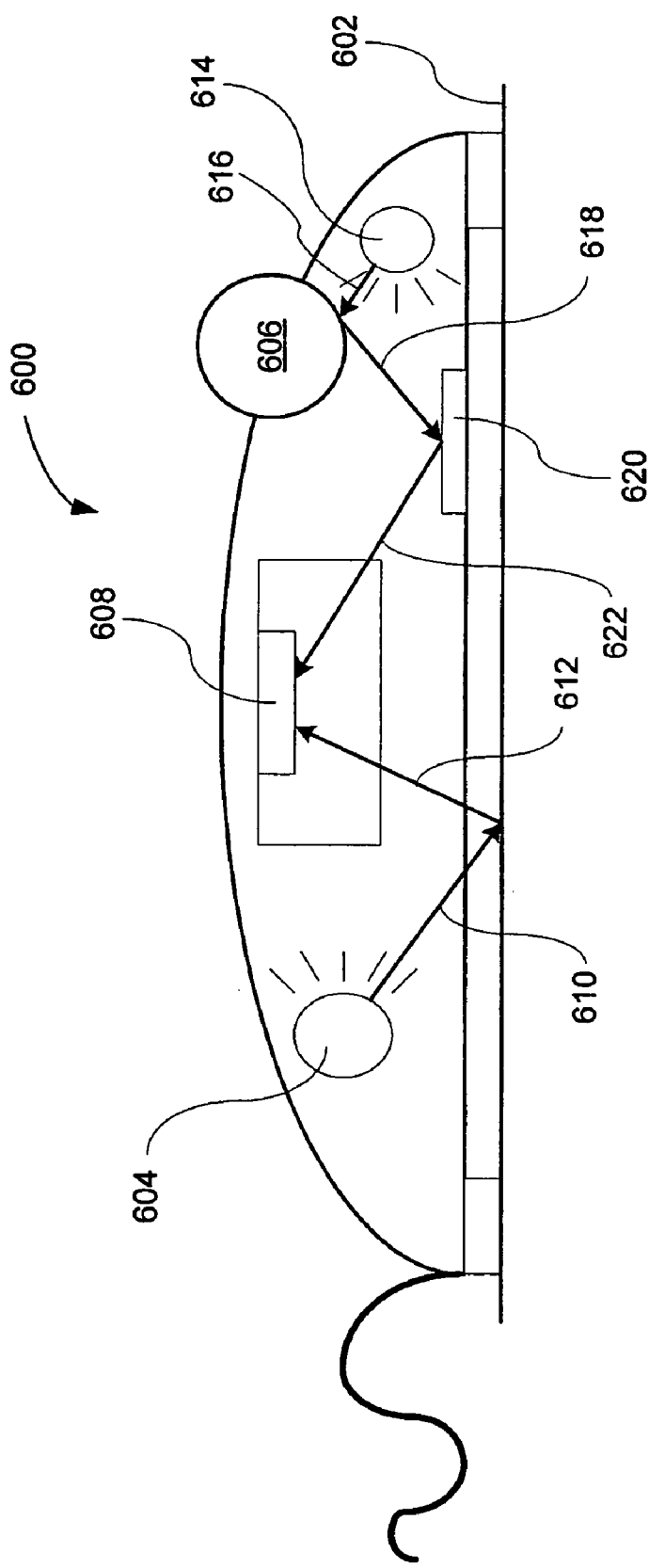
FIG. 6 shows a cross-sectional side view of an example of an implementation of an optical navigation system that detects the motion of two different surfaces.

FIG. 6 shows a cross-sectional side view of an example of an implementation of an optical navigation system that detects motion of two different navigation surfaces, in this instance, a 3-D optical mouse 600. 3-D optical mouse 600 includes two illuminators 604 and 614. Illuminator 604 is used for x-y plane tracking on navigation surface 602. In an example of operation, illuminator 604 may emit the emitted optical radiation 610 at navigation surface 602, resulting in reflected optical radiation 612 that is received by navigation sensor 608. Illuminator 614 is used for Z-wheel 606 motion detection. In an example of operation, illuminator 614 may emit emitted optical radiation 616 that is reflected by the Z-wheel 606 to a reflector plate 620 that results in reflected optical radiation 622 that is received by navigation sensor 608. Thus there are two optical pipelines for image acquisition found in 3-D optical mouse 600 and the image integration and processing may be performed as shown in FIGS. 4 and 5.

Figure 7:
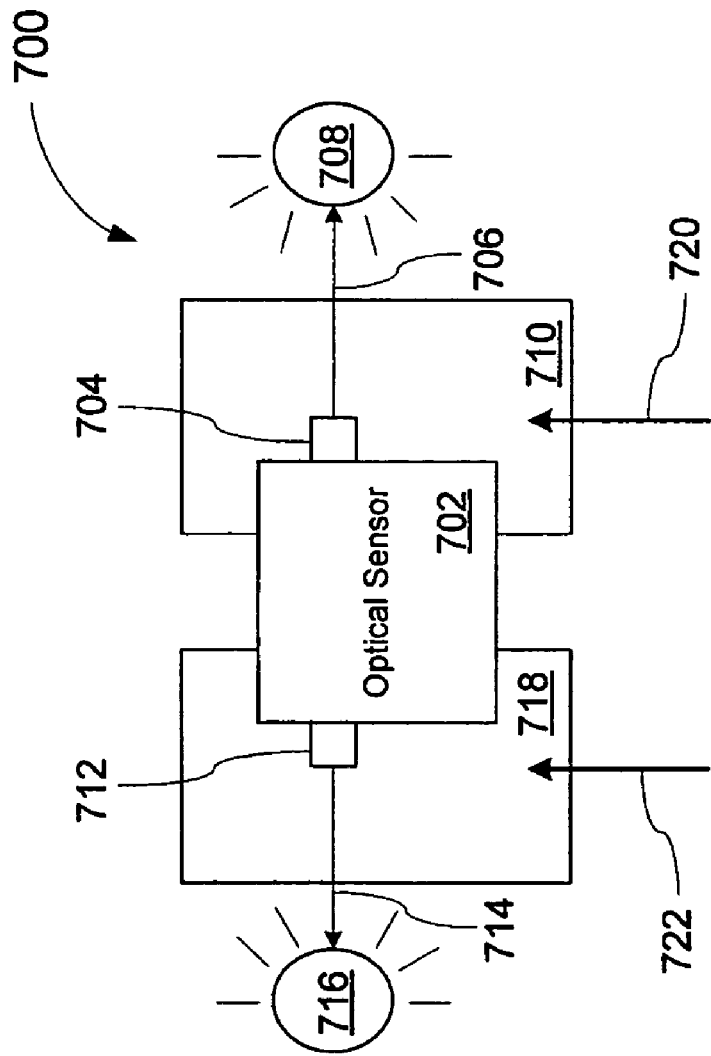
FIG. 7 shows a top view of another example of an implementation of an optical navigation system that detects the motion of two different surfaces.

In FIG. 7, a top view of another example of an implementation of an optical navigation system 700 that detects motion of two different surfaces is shown. In this implementation, which is similar to that of FIG. 4, the navigation surfaces include navigation surfaces 710 and 718, which may, for example, be two conveyors moving in the direction shown by arrows 720 and 722, respectively. Optical sensor 702, which is positioned between navigation surfaces 710 and 718, may include Driver A 704 and Driver B 712 that are in signal communication with Illuminator A 708 and Illuminator B 716, respectively, where Illuminator A 708 and Illuminator B 716 may be VCSELs, LEDs, or any other light source.

When images are required from navigation surface 710, Driver A 704 will power on Illuminator 708 by means of a control signal 706, while Illuminator 716 will be powered off. Optical sensor 702 will multiplex itself to perform image correlation on navigation surface 710 to determine the relative motion direction of navigation surface 710. When images are required from navigation surface 718, Driver B 712 will power on Illuminator 716 by means of a control signal 714, while Illuminator 708 will be powered off. The process repeats itself and optical sensor 702 performs image correlation on navigation surface 718 to determine the relative motion direction of navigation surface 718. When the process is completed for navigation surface 718, the cycle repeats itself for navigation surface 710. Thus optical navigation system 700 is able to detect and adjust the speed of both conveyors with a single optical sensor 702, thereby reducing the cost of the navigation device, as well as eliminating the variances that may arise from using two separate devices to measure the speed of the conveyors.

While the foregoing description refers to an optical navigation system using VCSELs, the subject matter of this disclosure is not limited to such systems but also includes, in general, other optical navigation systems that may use other illumination sources such as a diode, photo-diode, LED, light bulb, or other semiconductor lasers such as an edge-emitting laser. The optical sensor may include an array of photo-detectors such as photo-diodes, photo-cathodes, or photo-multipliers. It is appreciated by those skilled in the art that the optical radiation may be visible, infrared, and/or ultraviolet light radiation.

Moreover, it will be understood that the foregoing description of certain implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. An optical navigation system with multiplexed imaging ("ONS-MI"), the ONS-MI comprising:
   a first optical pipeline capable of image acquisition from a first navigation surface;
   a second optical pipeline capable of image acquisition from a second navigation surface, the second navigation surface being separate from the first navigation surface such that relative motion of the second navigation surface is independent of relative motion of the first navigation surface; and
   an optical sensor capable of receiving and processing images from the first optical pipeline and the second optical pipeline.

2. The ONS-MI of claim 1, wherein the first optical pipeline includes at least one light source configured to emit emitted optical radiation at the first navigation surface and the second optical pipeline includes at least one light source configured to emit emitted optical radiation at the second navigation surface.

3. The ONS-MI of claim 2, wherein the at least one light source of the first optical pipeline is chosen from a group consisting of a light emitting diode ("LED"), a photo-cathode, a vertical cavity surface-emitting laser ("VCSEL"), an edge-emitting laser, and a light bulb, and the at least one light source of the second optical pipeline is chosen from a group consisting of an LED, a photo-cathode, a VCSEL, an edge-emitting laser, and a light bulb.

4. The ONS-MI of claim 2, wherein the optical sensor is configured to receive the emitted optical radiation reflected from the first navigation surface and to receive the emitted optical radiation reflected from the second navigation surface.

5. The ONS-MI of claim 4, wherein the optical sensor includes at least one illuminator driver configured to power on and power off the first optical pipeline and the second optical pipeline.

6. The ONS-MI of claim 5, wherein the at least one illuminator driver is configured to power off the second optical pipeline when the optical sensor is receiving reflected optical radiation from the first navigation surface and to power off the first optical pipeline when the optical sensor is receiving reflected optical radiation from the second navigation surface.

7. The ONS-MI of claim 6, wherein the at least one illuminator driver is configured to modify the power on and off interval of the first optical pipeline and the second optical pipeline.

8. The optical navigation system of claim 7, wherein the duration of the power on and off interval of the first optical pipeline and the second optical pipeline is adjusted responsive to the rate of motion of the first navigation surface and the second navigation surface, respectively.

9. The optical navigation system of claim 7, wherein the duration of the power on and off interval of the first optical pipeline and the second optical pipeline is adjusted responsive to a predetermined programmable set of criteria.

10. The ONS-MI of claim 1, further including memory in signal communication with the optical sensor wherein images received from the first navigation surface and from the second navigation surface are stored.

11. The ONS-MI of claim 1, further including at least one other optical pipeline capable of image acquisition from at least one other navigation surface.

12. A method for navigating an optical navigation system on a plurality of navigation surfaces, the method comprising:
    emitting emitted optical radiation from a first light source to a first navigation surface;
    emitting emitted optical radiation from a second light source to a second navigation surface, the second navigation surface being separate from the first navigation surface such that relative motion of the second navigation surface is independent of relative motion of the first navigation surface; and
    receiving reflected optical radiation from the first navigation surface and from the second navigation surface at an optical sensor.

13. The method of claim 12, wherein the optical sensor includes at least one illuminator driver configured to power on and power off the first light source and the second light source.

14. The method of claim 13, further including:
    powering on the first light source and powering off the second light source for a first predetermined time interval;
    receiving reflected optical radiation from the first navigation surface at the optical sensor;
    after expiration of the first predetermined time interval, powering off the first light source and powering on the second light source for a second predetermined time interval; and
    receiving reflected optical radiation from the second navigation surface at the optical sensor.

15. The method of claim 14, further including adjusting the duration of the first predetermined time interval and the second predetermined time interval responsive to the rate of motion of the first navigation surface and the second navigation surface, respectively.

16. The method of claim 15, further including storing images received from the first navigation surface and from the second navigation surface in memory.

17. The method of claim 16, further including:
    storing images received from the first navigation surface and from the second navigation surface in memory;
    retrieving stored images received from the first navigation surface when powering on the first light source; and
    retrieving stored images received from the second navigation surface when powering on the second light source.

18. An optical navigation system with multiplexed imaging ("ONS-MI"), the ONS-MI comprising:
    means for emitting emitted optical radiation from a first light source to a first navigation surface;
    means for emitting emitted optical radiation from a second light source to a second navigation surface, the second navigation surface being separate from the first navigation surface such that relative motion of the second navigation surface is independent of relative motion of the first navigation surface; and
    means for receiving and processing images reflected from the first navigation surface and from the second navigation surface.

19. The ONS-MI of claim 18, wherein the means for emitting emitted optical radiation from the first light source and from the second light source is a vertical cavity surface-emitting laser ("VCSEL").

20. The ONS-MI of claim 19, wherein the means for receiving and processing images reflected from the first navigation surface and from the second navigation surface is an optical sensor configured to power on and to power off the first light source and the second first light source at predetermined intervals.

* * * * *